Feb. 27, 1934. F. E. KAPP Re. 19,096

SAND OR SEDIMENT TRAP FOR PUMPING WELLS

Original Filed Jan. 7, 1933 2 Sheets-Sheet 1

Inventor

Frank E. Kapp

By Clarence A. O'Brien

Attorney

Feb. 27, 1934. F. E. KAPP Re. 19,096

SAND OR SEDIMENT TRAP FOR PUMPING WELLS

Original Filed Jan. 7, 1933 2 Sheets-Sheet 2

Inventor

Frank E. Kapp

By Clarence A. O'Brien

Attorney

Reissued Feb. 27, 1934 Re. 19,096

UNITED STATES PATENT OFFICE 19,096

SAND OR SEDIMENT TRAP FOR PUMPING WELLS

Frank E. Kapp, Tidioute, Pa.

Original No. 1,933,595, dated November 7, 1933, Serial No. 650,701, January 7, 1933. Application for reissue January 10, 1934. Serial No. 706,153

2 Claims. (Cl. 103—202)

This invention relates to a sand or sediment trap for wells, and the general object of the invention is to provide means for attaching an elongated cylinder to a part of the sucker rods with the bottom of the cylinder closed and its top open so that sand or sediment will be caught and held in the cylinder.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 1:
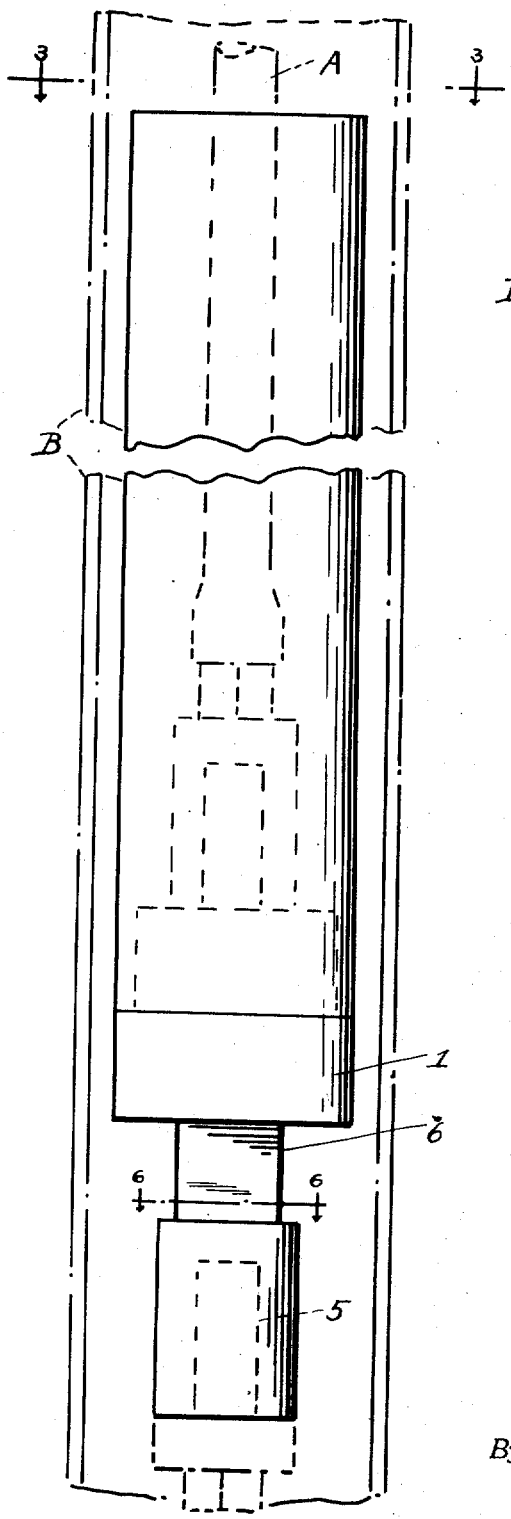
Figure 1 is an elevation showing the invention in use.
Figure 3:
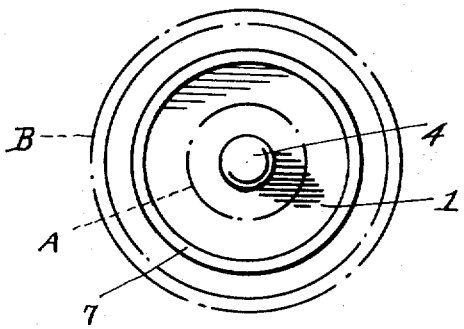
Figure 3 is a section on line 3—3 of Figure 1.
Figure 4:
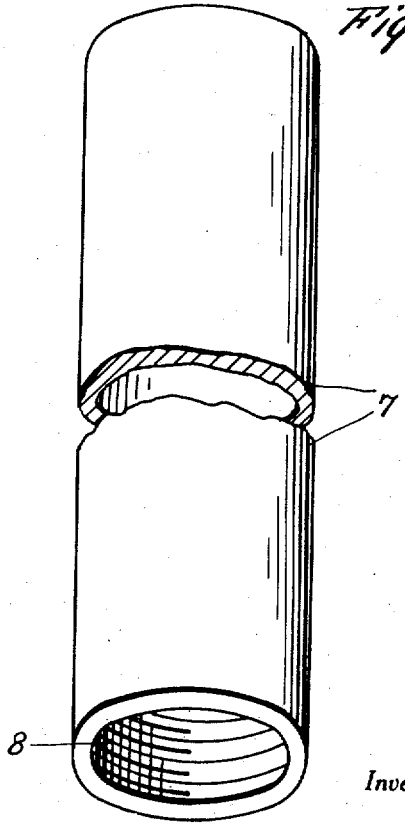
Figure 4 is a perspective view of the cylinder.
Figure 2:
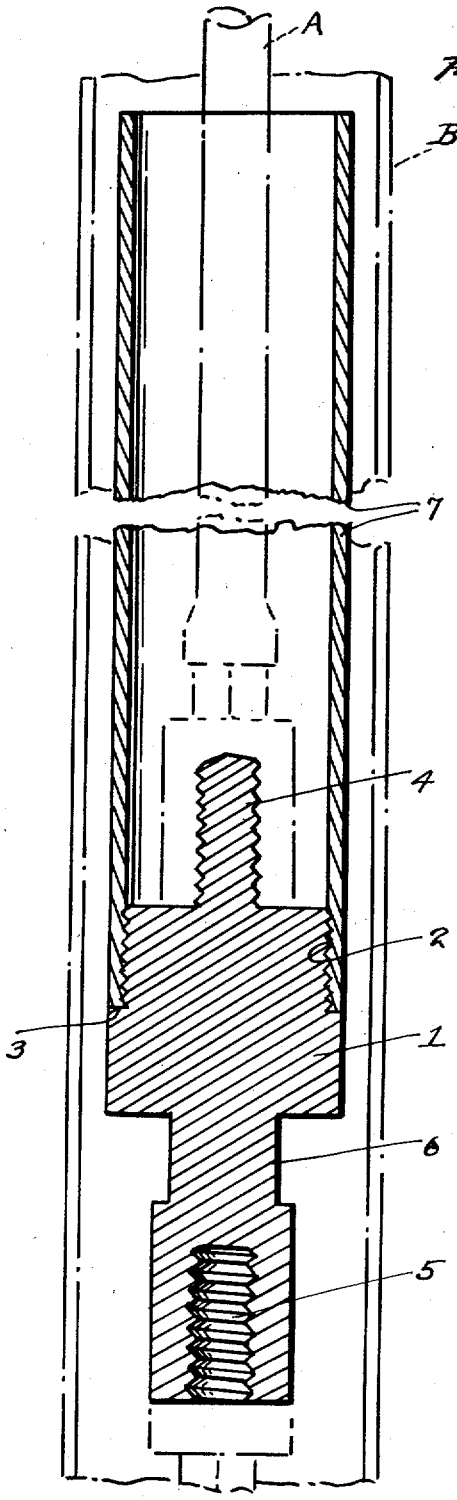
Figure 2 is a longitudinal sectional view through Figure 1.
Figure 5:
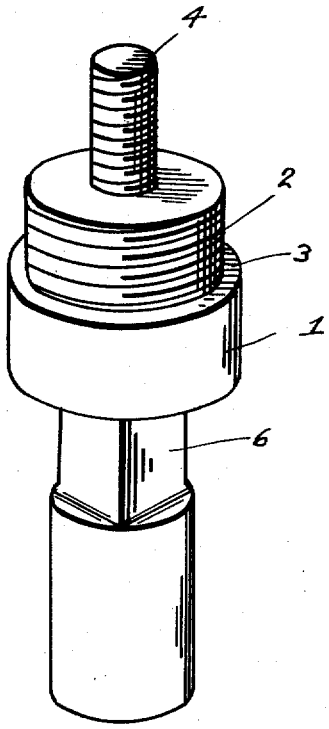
Figure 5 is a perspective view of the coupling.
Figure 6:
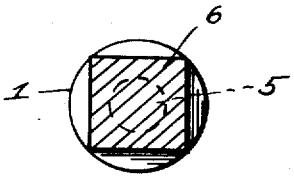
Figure 6 is a section on line 6—6 of Figure 1.

In these views the numeral 1 designates a coupling member which has its upper part formed with exterior threads 2. This threaded part is of slightly less diameter so as to provide a shoulder 3. The upper part of the portion 2 is formed with a threaded reduced part 4 and the lower reduced part of the member 1 is formed with an internally threaded socket 5. An intermediate portion of the member 1 is of non-circular shape in cross section as shown at 6 so as to provide means whereby a tool can grip the member while the other parts are being screwed thereto.

The cylinder is shown at 7 and has its lower end internally screw threaded as shown at 8 so that it can screw on the part 2 with its lower end engaging the shoulder 3. Thus the lower end of the cylinder is closed by the member 1 and a part of the sucker rod A is threaded to the part 4 as shown, and another part of the rod is threaded to the socket 5.

The cylinder can be of any convenient length (ordinarily 4 to 5 feet is sufficient) and the diameter should be as large as possible so as to hold a large amount of sediment or sand. It must clear the tubing B nicely.

The sand or sediment, as is well known will mix with the oil or water during the pumping operation and be carried part way up the tubing. As soon as the pumping operation ceases the sediment or sand starts to settle and it will be caught in the cylinder which is preferably placed as near to the valve as possible. When the well is pulled the trap is brought to the surface and dumped.

This invention keeps the tube clean and thereby reduces wear of valve parts and reduces cost.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:

1. In combination with a well tubing and a pump rod assembly, a coupling member having a threaded socket in its lower end for receiving a part of the assembly, a reduced threaded part at the upper end of the coupling for receiving another part of the assembly and an imperforate cylinder having its lower end threaded to the coupling member with its upper end open, the lower end of the cylinder being closed by the coupling member and said cylinder being of considerable length and of considerably less diameter than the diameter of the well tubing.

2. The combination with a well tubing and a solid pump rod assembly, of an axially extending imperforate cylindrical sleeve carried by said solid rod, said sleeve having an outside diameter less than the inside diameter of the well tubing, thereby defining an annular space between said sleeve and the well tubing and also defining an annular space between said rod and sleeve, which latter space is open at the top and closed at the bottom, whereby all of the ascending fluid is forced to pass through said space between said sleeve and tubing, and the major portion of any settling material will be collected by said sleeve.

FRANK E. KAPP.